(12) United States Patent
Itoh et al.

(10) Patent No.: US 7,993,767 B2
(45) Date of Patent: Aug. 9, 2011

(54) SOLID-STATE POLYMER ELECTROLYTE MEMBRANE, METHOD FOR MANUFACTURE THEREOF AND SOLID-STATE POLYMER ELECTROLYTE FUEL CELL THEREWITH

(75) Inventors: Takahito Itoh, Tsu (JP); Yuichi Aihara, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 982 days.

(21) Appl. No.: 10/594,997

(22) PCT Filed: Apr. 8, 2005

(86) PCT No.: PCT/JP2005/006967
§ 371 (c)(1),
(2), (4) Date: Jan. 24, 2007

(87) PCT Pub. No.: WO2005/099010
PCT Pub. Date: Oct. 20, 2005

(65) Prior Publication Data
US 2008/0269360 A1 Oct. 30, 2008

(30) Foreign Application Priority Data
Apr. 9, 2004 (JP) .................................. 2004-114879

(51) Int. Cl.
*H01M 8/10* (2006.01)
(52) U.S. Cl. ....... 429/33; 429/28; 429/307; 210/500.27; 521/27; 528/482
(58) Field of Classification Search .................... 429/33, 429/28, 307; 521/27; 210/500.27; 528/482
See application file for complete search history.

(56) References Cited

U.S. PATENT DOCUMENTS

| | | | | |
|---|---|---|---|---|
| 5,114,809 A | * | 5/1992 | Nakacho et al. | 429/315 |
| 6,924,067 B1 | * | 8/2005 | Ito et al. | 429/307 |
| 7,038,004 B2 | * | 5/2006 | Chen et al. | 528/86 |
| 7,060,735 B2 | | 6/2006 | Taniguchi et al. | |
| 2006/0094792 A1 | * | 5/2006 | Colombo et al. | 521/27 |

FOREIGN PATENT DOCUMENTS

CN 1385464 A 12/2002
(Continued)

OTHER PUBLICATIONS

Huan Chen et al. "Synthesis of Arenesulfonated Hyperbranched Polyimide from A2+B3 Monomers", Polymer Journal, vol. 35, No. 3 (2003) pp. 280-285.*

(Continued)

*Primary Examiner* — Peter D. Mulcahy
*Assistant Examiner* — Henry Hu
(74) *Attorney, Agent, or Firm* — Christie, Parker & Hale, LLP

(57) ABSTRACT

The present invention provides an inexpensive solid-state polymer electrolyte membrane to be used in a solid-state polymer electrolyte fuel cell, which can be manufactured by using inexpensive raw materials through a simpler chemical synthesis process, achieves good heat resistance and demonstrates superior proton conductivity at low humidity. A primary constituent of the solid-state electrolyte polymer film to be used in a solid-state polymer electrolyte fuel cell according to the present invention is a hyperbranched polymer having an acidic functional group such as sulfonic acid disposed at the terminal of a side chain thereof. The hyperbranched polymer may be, for instance, poly[(bis(oligo-ethylene glycol) benzoate)].

3 Claims, 4 Drawing Sheets

FOREIGN PATENT DOCUMENTS

| | | | |
|---|---|---|---|
| CN | 2005-80012249.3 | * | 2/2009 |
| JP | 9-87510 | | 3/1997 |
| JP | 10-67847 | * | 3/1998 |
| JP | 10-340732 | * | 12/1998 |
| JP | 2001-213987 | | 8/2001 |
| JP | 2001-236973 | | 8/2001 |
| JP | 2003-327826 | * | 11/2003 |
| JP | 2004-087137 | | 3/2004 |
| KR | 2008-003475317 | * | 1/2008 |
| WO | WO 02-092638 A1 | | 11/2002 |
| WO | WO-02-092638 A1 | * | 11/2002 |
| WO | WO-2005-099010 A1 | * | 10/2005 |

OTHER PUBLICATIONS

Takahito Itoh et al., "Ionic conductivity of the hyperbranched polymer-lithium metal salt systems", Journal of Power Sources, 81-82 (1999) pp. 824-829.*

Office Action issued in corresponding Chinese Patent Application No. 2005800122493 dated Jan. 25, 2008.

Chen, H., et al., "Synthesis of Arenesulfonated Hyperbranched Polyimide from $A_2+B_3$ Monomers", Polymer Journal, vol. 35, No. 3, pp. 280-285, Sep. 26, 2002.

JP 10-340732 cited in the Chinese Office Action was previously submitted in the Information Disclosure Statement filed Sep. 29, 2006.

International Search Report issued in International Patent Application No. PCT/JP2005/006967 on Aug. 2, 2005.

Takahito Itoh et al., "Ionic conductivity of the hyperbranched polymer-lithium metal salt systems", Journal of Power Sources, 81-82 (1999) pp. 824-829.

Huan Chen et al. "Synthesis of Arenesulfonated Hyperbranched Polyimide from $A_2+B_3$ Monomers", Polymer Journal, vol. 35, No. 3 (2003) pp. 280-285.

Seiji Horii et al., "Properties of Solid Polymer Electrolyte using Hyperbranched Polymer with Acetyl and Acryloyl Groups", Polymer Preprints, Japan, vol. 52, No. 4 (2003) p. 854.

Takahito Itoh et al., "Properties of Solid Polymer Electrolyte using Cross-Linked Hyperbranched Polymer", Polymer Preprints, Japan, vol. 52, No. 12 (2003) pp. 3267-3268.

Korean Patent Allowance Notification for Patent No. 2008-003475317 Dated Jan. 24, 2008.

Certificate of Chinese Patent No. 2005-80012249.3 Dated Apr. 8, 2005.

* cited by examiner

SOLID-STATE POLYMER ELECTROLYTE MEMBRANE, METHOD FOR MANUFACTURE THEREOF AND SOLID-STATE POLYMER ELECTROLYTE FUEL CELL THEREWITH

TECHNICAL FIELD

The present invention relates to a solid-state polymer electrolyte membrane to be used in a fuel cell, a method for manufacturing the solid-state polymer electrolyte membrane and a solid-state polymer electrolyte fuel cell, and more specifically, it relates to a proton conductive solid-state polymer electrolyte membrane adopting a dendritic structure, a method for manufacturing the proton conductive solid-state polymer electrolyte membrane and a solid-state polymer electrolyte fuel cell.

BACKGROUND ART

Polymer electrolyte fuel cells that achieve low carbon dioxide emission and high electrical conversion efficiency are attracting a great deal of interest as clean energy systems of the next generation. The range of applications for such a fuel-cell, which can be provided at low cost by using a high-performance proton conductive polymer electrolyte membrane constituted of an inexpensive material, is diverse, including a power source for an electric car and a distribution type power source.

A solid-state polymer electrolyte fuel cell includes a fuel electrode constituted with one of the surfaces of a solid-state polymer electrolyte membrane with proton conductivity and an air electrode constituted with the other film surface. As a fuel gas containing hydrogen is supplied to the fuel electrode and an oxidizing gas containing oxygen such as air is supplied to the air electrode, a fuel electrode reaction whereby hydrogen molecules are separated into hydrogen ions (protons) and electrons occurs at the fuel electrode and an air electrode reaction whereby water is formed with oxygen, hydrogen ions and electrons occurs at the air electrode (see the following electrochemical reaction formulas) and as a result, an electromotive force is generated.

Fuel electrode: $H_2 \rightarrow 2H^+ + 2e^-$ 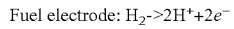

Air electrode: $2H^+ + (1/2)O_2 + 2e^- \rightarrow H_2O$ 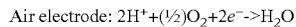

The solid-state polymer electrolyte membranes achieving proton conductivity in the related art include a perfluorocarbon sulfonic acid membrane (e.g., Nafion (product name) membrane manufactured by DuPont USA), a membrane constituted of a mixed material containing fluorocarbon sulfonic acid and polyvinylidene fluoride, a membrane obtained by grafting trifluoroethylene into a fluorocarbon matrix and a cation conductive membrane constituted with a cation exchange membrane of polystylene series having a sulfonic-group. When these solid-state polymer electrolyte membranes are wet, they work as proton conductive electrolytes. However, the properties of the solid-state polymer electrolyte membranes become altered at high temperature and the levels of their proton conductivity become lower. For this reason, water vapor is added to the gases supplied to the electrolytes and the operating temperature is controlled so as not to deviate from a low temperature range of 50 to 100° C.

As described above, the characteristics that a viable solid-state polymer electrolyte membrane is required to provide include; (1) superior proton conductivity, (2) easy management of the moisture contained in the electrolyte membrane and (3) a superior heat resisting property.

The characteristics requirements are addressed in patent reference literature 1, which discloses an electrolyte membrane manufactured by graft-polymerizing polyvinyl pyridine onto a base polymer that can be graft-polymerized and doping phosphoric acid onto the grafted base material. Patent reference literature 1 states that the resulting electrolyte membrane demonstrates superior proton conductivity at high temperatures equal to or greater than 100° C.

In addition, patent reference literature 2 discloses an electrolyte membrane achieving good proton conductivity under high temperature (150° C.) and low humidity conditions, by impregnating an acidic polymer (e.g., perfluorosulphonic acid) with a basic polymer (e.g., propylene glycol).

(Patent reference literature 1) Japanese Laid Open Patent Publication No. 2001-213987
(Patent reference literature 2) Japanese Laid Open Patent Publication No. 2001-236973
(Nonpatent reference literature 1) Takahito Itoh et al., "Ionic Conductivity of the Hyperbranched Polymer-Lithium Metal Salt Systems" J. of Power Sources, 81-82 (1999), p 824 to 829

DISCLOSURE OF THE INVENTION

Problems to be Solved by the Invention

However, there are problems in that the electrolyte membranes according to the inventions disclosed in patent reference literatures 1 and 2 are manufactured use of expensive raw materials and complicated processes, resulting in high production costs and low levels of productivity.

Accordingly, in view of the above problems in the related art, the present invention has an object to provide an inexpensive solid-state polymer electrolyte membrane to be used in a solid-state polymer electrolyte fuel cell, which can be manufactured with improved productivity by using an inexpensive raw material through a simpler chemical synthesis process, achieves good heat resistance and demonstrates superior proton conductivity at low humidity, a method for manufacturing this solid-state polymer electrolyte membrane and a solid-state polymer electrolyte fuel cell that includes the solid-state polymer electrolyte membrane.

Means for Solving the Problems

In order to achieve the object described above, the inventors of the present invention have diligently researched a technology whereby a basic polymer skeleton constituted with a hyperbranched polymer (see nonpatent reference literature 1) adopting a dendritic structure, which was developed by the inventors of the present invention as an electrolyte material to be used in a lithium battery, is reformed into a material to constitute an electrolyte membrane for fuel cells.

The hyperbranched polymer adopting the dendritic structure described above (may also be referred to as a dendritic polymer) is a polymer with branch molecules three-dimensionally and dendritically extending from a central molecule which constitutes the core of the dendritic structure. Compared to standard branched polymers and linear polymers, such a dendritically branched polymer has a greater three-dimensional bulk, achieves a higher level of solubility and is provided as an amorphous polymer which assures superior processability and allows numerous functional groups to be included at the molecular terminals.

The research results allowed the inventors of the present invention to conclude that a solid-state polymer electrolyte membrane for a fuel cell, achieving superior proton conductivity, can be obtained by substituting the functional groups at the side-chain terminals, constituted with acetyl groups, with acidic functional groups such as phenyl sulfonic acid.

More specifically, a solid-state polymer electrolyte membrane, a primary constituent of which is a hyperbranched polymer having an acidic functional group disposed at a terminal of a side chain thereof is provided in the first aspect of the present invention.

The hyperbranched polymer having an acidic functional group disposed at the terminal of the side chain thereof may be poly (bis(oligo-ethylene glycol) benzoate) composed as indicated in general formula 1 below.

(general formula 1)

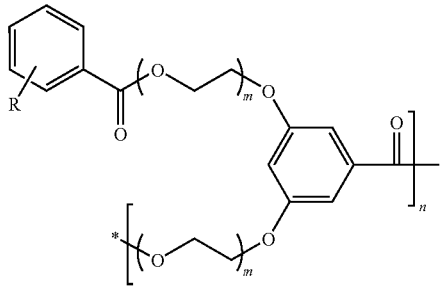

The acidic functional group (R in general formula 1 above) may be at least one kind of acidic functional group selected from; sulfonic acid, phosphoric acid, phosphonic acid, carboxylic acid, alkyl-sulfonic acid, perfluoro alkyl-sulfonic acid and fluoroboric acid. However, it may be an acidic functional group other than those.

The poly(bis(oligo-ethylene glycol) benzoate) may be a polymer adopting a dendritic structure, which is obtained by polymerizing an $A_2B$-type monomer synthesized from an oligo-ethylene oxide chain expressed as $(CH_2CH_2O)_m$ (m=1 to 6) and dioxybenzoate.

Alternatively, a primary constituent of the solid-state polymer electrolyte membrane may be a mixture of a hyperbranched polymer having an acidic functional group disposed at a terminal of the side chain thereof and a bridged polymer having a network structure. By combining a hyperbranched polymer having an acidic functional group disposed at the terminal of the side chain thereof and a bridged polymer having a network structure as described above, the mechanical strength of the solid-state polymer electrolyte membrane according to the present invention can be further improved. The bridged polymer having a network structure is a bridged polymer having at least one polymerizable functional group such as an allyl group, an acryl group, and isocyanate group or an epoxy group disposed at the terminal of a molecule and formed so as to achieve a two-dimensional or three-dimensional network structure through a bridging reaction. However, since the molecule chains simply need to be bridged through a chemical bond or physical bond, the bridged polymer is not limited to these examples. In addition, since the poly (bis(oligo-ethylene glycol) benzoate) according to the present invention includes an aromatic nucleus in its basic skeleton, it is expected to achieve a high level of heat resistance.

In a second aspect of the present invention, a method for manufacturing a solid-state polymer electrolyte membrane, comprising a first step in which poly(bis(oligo-ethylene glycol) benzoate) is synthesized by polymerizing an $A_2B$-type monomer synthesized from an oligo-ethylene oxide chain expressed as $(CH_2CH_2O)_m$ (m=1 to 6) and dioxybenzoate; and a second step in which an acidic functional group is introduced at a terminal of a side chain of the poly(bis(oligo-ethylene glycol) benzoate).

During the second step, the acidic functional group can be introduced at the terminal of the side chain by first esterifying the side chain terminal with alkaline metallic salt of o-, m- or p-sulfobenzoic acid or disulfobenzoic acid and converting to a sulfonic group.

Alternatively, the acidic functional group may be introduced at the side chain terminal during the second step by first esterifying the side chain terminal with a benzoic acid compound having as a functional group thereof phosphoric acid or phosphonic acid ester and converting to an acidic functional group through hydrolysis of the functional group, i.e., phosphoric acid or phosphonic acid ester.

As explained above, the solid-state polymer electrolyte membrane according to the present invention, which can be manufactured through a simple chemical synthesis by using inexpensive raw materials such as oligo-ethylene oxide chain or dioxybenzoate, can be produced with improved productivity. In addition, the solid-state polymer electrolyte membrane according to the present invention manufactured as described above achieves a desirable heat resisting property and also demonstrates superior proton conductivity even at low humidity.

In a third aspect of the present invention, a solid-state polymer electrolyte fuel cell that includes the solid-state polymer electrolyte membrane described above is provided. The solid-state polymer electrolyte fuel cell according to the present invention adopting such a structure achieves the following advantage. Namely, while it is normally necessary to use a humidifier when operating a fuel cell at high temperature, the solid-state polymer electrolyte fuel cell according to the present invention, which includes the solid-state polymer electrolyte membrane described above, can be operated at high temperatures without requiring the use of a humidifier.

Effect of the Invention

The present invention provides an inexpensive solid-state polymer electrolyte membrane to be used in a solid-state polymer electrolyte fuel cell, which can be manufactured with improved productivity by using an inexpensive raw material through a simpler chemical synthesis process, achieves good heat resistance and demonstrates superior proton conductivity at low humidity, a method for manufacturing this solid-state polymer electrolyte membrane and a solid-state polymer electrolyte fuel cell that includes the solid-state polymer electrolyte membrane.

BEST MODE FOR CARRYING OUT THE INVENTION

Figure 1:
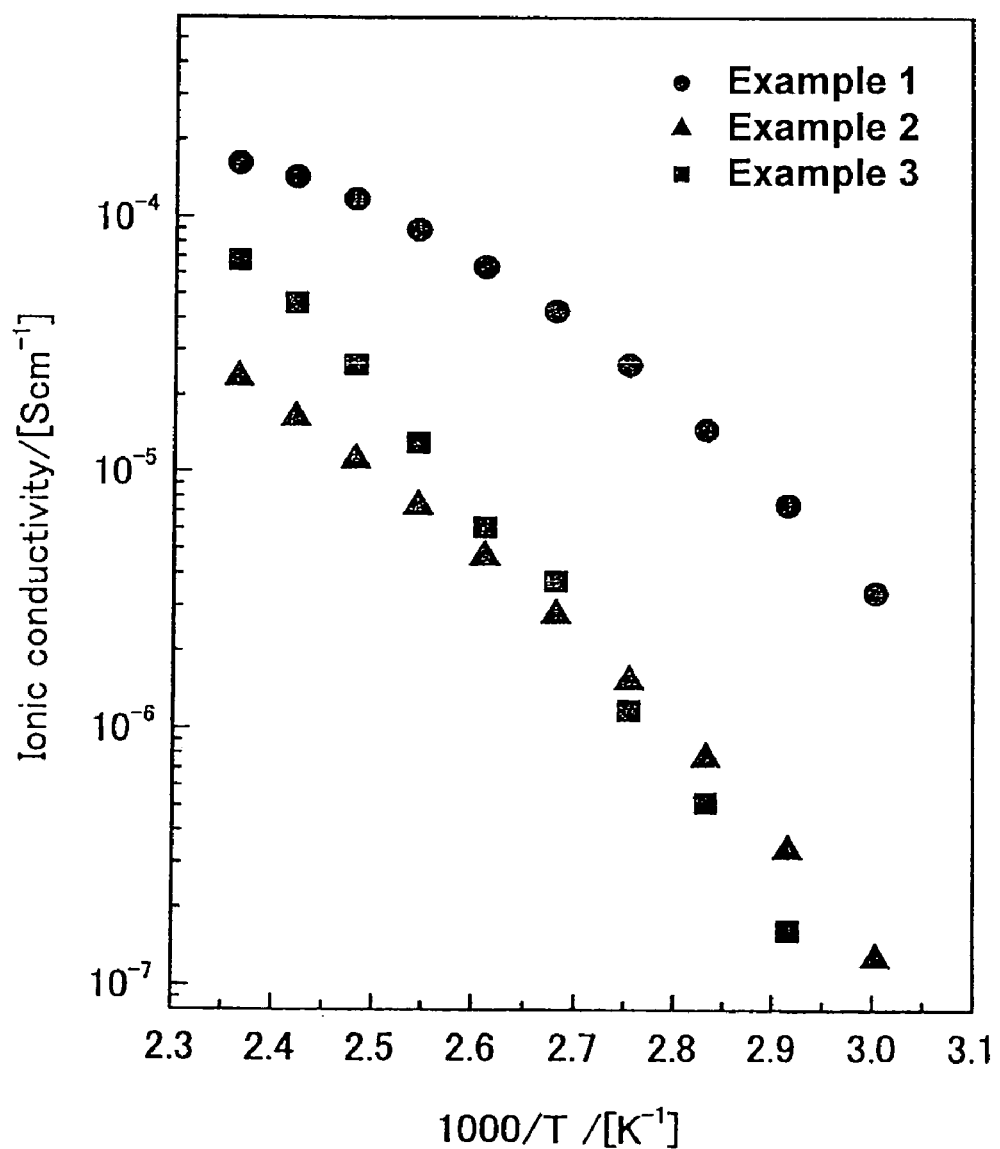
FIG. 1 is a graph of the ionic conductivity levels of hyperbranched polymers, each having an acidic functional group disposed at a terminal of a side chain thereof, achieved in examples 1 through 3.

While the best mode for carrying out the present invention is explained below in reference to examples, the scope of the present invention is not limited in any way whatsoever by the embodiments and the present invention may be embodied in diverse variations without altering the essential components thereof.

Example 1

Synthesizing Monomer for Hyperbranched Polymer

Methyl 3,5-dihydroxy benzoate (1) (8.41 g, 50.0 mmol), triethylene glycol monochlorohydrin (2) (18.5 g, 110 mmol), $K_2CO_3$ (49.8 g 361 mmol), 18-Crown-6 (0.30 g, 1.15 mmol) and 200 mL of acetonitrile were measured into a 300 mL eggplant-shaped flask equipped with a magnetic stirrer and a Dimroth, and the mixture underwent a reflux process for 50 hours in a nitrogen atmosphere within the flask. A white solid substance having become deposited was removed through suction filtration and an oil-like product was obtained by removing the solvent from the filtrate with an evaporator. The oil thus obtained was passed through a silica gel column filled with dichloromethane, a first band and a second band containing any non-reactants were removed by using ethyl acetate, a third band was collected by using the methanol as an eluent and then the solvent was removed under pressure. As a result, 15.30 g (71%) of methyl 3,5-bis [(8'-hydroxy-3',6'-dioxaoctyl)oxy)]benzoate (3) oil was obtained assuming a pale yellow transparent state (see reaction formula 1 below).

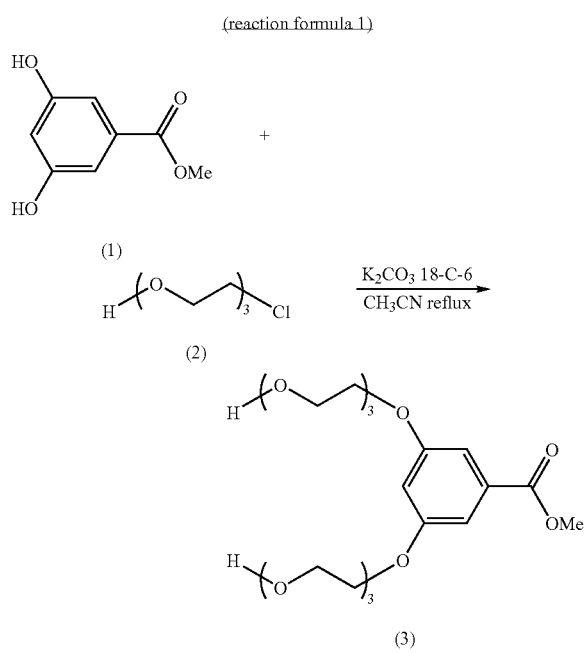

(Synthesizing Hyperbranched Polymer)

Methyl 3,5-bis[(8'-hydroxy-3',6'-dioxaoctyl)oxy)]benzoate (3) (4.01 g, 9.28 mmol) was measured into a 30 mL eggplant-shaped flask equipped with a magnetic stirrer, tributyltin chloride (tetravalent) (0.05 g, 0.15 mmol) as a catalyst was added into the flask, and the flask, filled with a nitrogen atmosphere, was heated to 210° C. In this state, it underwent a polymerization reaction for two hours. The resulting rubber-like solid substance was dissolved in a small quantity of tetrahydrofuran (THF) and was made to precipitate in hexane. The precipitate was then collected through centrifugation. The collected precipitate was dissolved again in a small quantity of THF and was made to precipitate in methanol. A polymer with a low molecular weight collected as a supernatant fluid through centrifugation was removed, and the remaining substance was dried in a vacuum to obtain 1.77 g (45%) of high molecular weight poly[(bis(triethylene glycol) benzoate)] (4) (molecular weight: Mn=14,000) assuming the state of a rubber-like solid substance (see reaction formula 2 below).

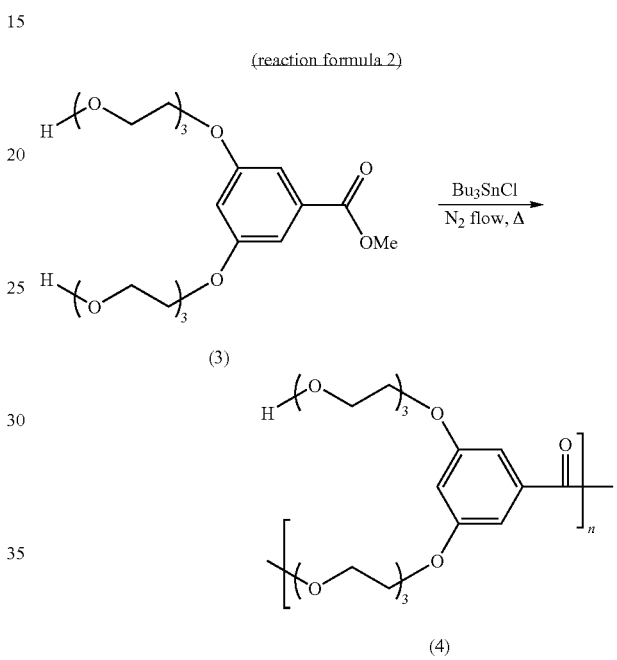

(Terminal Esterification for Hyperbranched Polymer Having Sulfonic Group at Terminal Thereof)

Poly[(bis(triethylene glycol) benzoate)] (4) (1.11 g, 2.78 mmol), 4-sulfobenzoic acid monopotassium salt (5) (3.33 g, 13.8 mmol), dimethylaminopyridine (DAMP, 6) (1.70 g, 13.8 mmol), N,N'-dicyclohexylcarbodiimide (DCC, 7) (5.73 g, 27.8 mmol) and 40 mL of N,N'-dimethylformamide (DMF) were measured into a 100 mL double-opening, eggplant-shaped flask equipped with a magnetic stirrer and the mixture was kept in a nitrogen atmosphere inside the flask and agitated for 24 hours. The insoluble matters were then removed through suction filtration and the filtrate was made to precipitate in ethyl acetate. After removing the supernatant through centrifugation, ethanol was added to the precipitate and the precipitate was washed through agitation. Next, the raw material as the supernatant fluid was removed through centrifugation and the precipitate was dried in a vacuum. As a result, 1.57 g (89%) of a potassium salt terminal-type hyperbranched polymer (8), assuming the state of white solid powder substance, was obtained (see reaction formula 3 below). While the potassium salt terminal-type hyperbranched polymer (8) is extremely hygroscopic and can be dissolved in $H_2O$, DMF and DMSO, it cannot be dissolved in THF, isopropyl ether (IPE) or $CHCl_3$.

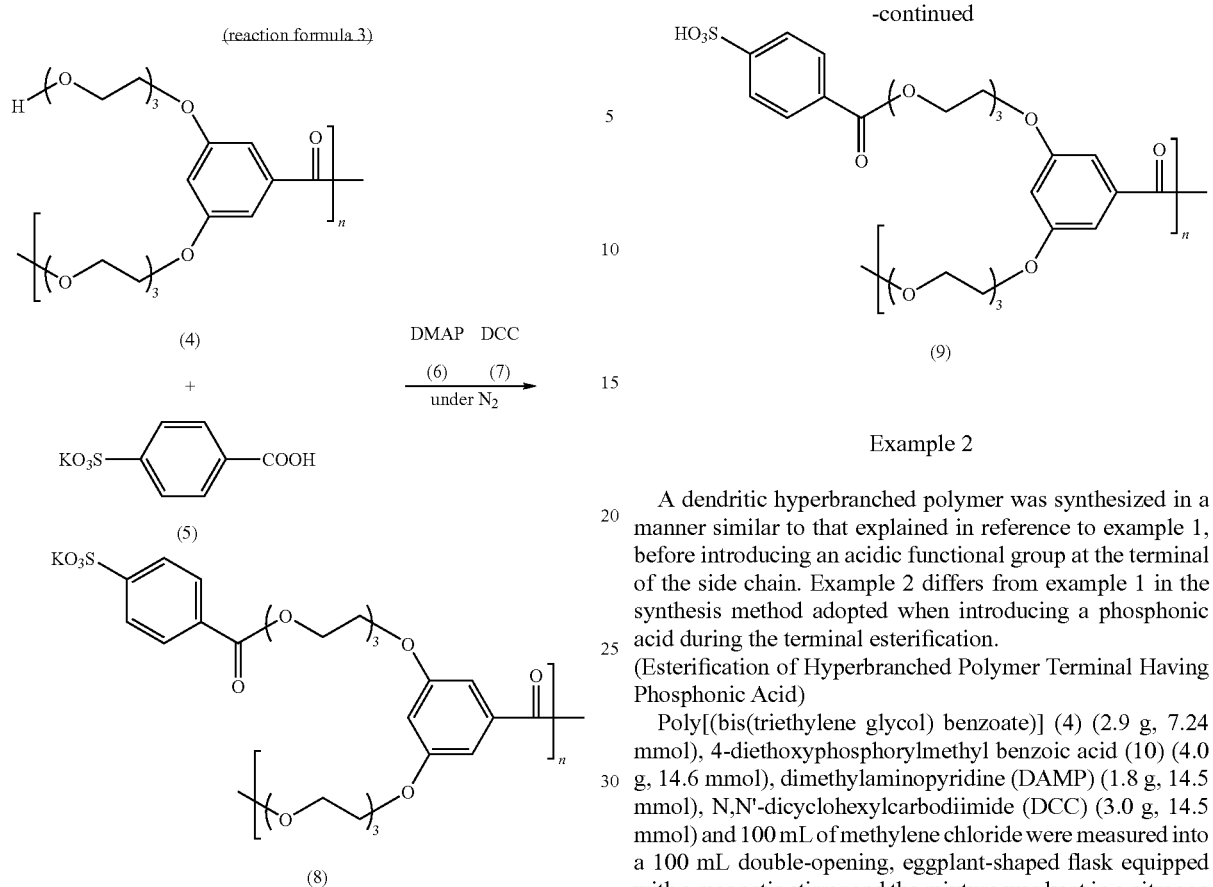

(Conversion to Acidic Functional Group)

1.57 g, (2.47 mmol) of the potassium salt terminal-type hyperbranched polymer (8) was measured into a 100 mL eggplant-shaped flask equipped with a magnetic stirrer and 30 mL of $H_2O$ was added and dissolved. Then, 60 mL of 1 N HCl was dropped into the solution, thereby obtaining a precipitate. The precipitate was collected through centrifugation and was dried in a vacuum. It was dissolved again in ethanol, impurities were removed through filtration, the solvent in the filtrate was removed via an evaporator and 1.36 g (96%) of a sulfonic acid terminal type-hyperbranched polymer (9), assuming the state of a pale yellow rubber-like substance, was obtained (see reaction formula 4 below). It is to be noted that the sulfonic acid terminal type-hyperbranched polymer (9) is soluble in $H_2O$, MeOH and EtOH and is also slightly soluble in $CHCl_3$.

Example 2

A dendritic hyperbranched polymer was synthesized in a manner similar to that explained in reference to example 1, before introducing an acidic functional group at the terminal of the side chain. Example 2 differs from example 1 in the synthesis method adopted when introducing a phosphonic acid during the terminal esterification.

(Esterification of Hyperbranched Polymer Terminal Having Phosphonic Acid)

Poly[(bis(triethylene glycol) benzoate)] (4) (2.9 g, 7.24 mmol), 4-diethoxyphosphorylmethyl benzoic acid (10) (4.0 g, 14.6 mmol), dimethylaminopyridine (DAMP) (1.8 g, 14.5 mmol), N,N'-dicyclohexylcarbodiimide (DCC) (3.0 g, 14.5 mmol) and 100 mL of methylene chloride were measured into a 100 mL double-opening, eggplant-shaped flask equipped with a magnetic stirrer and the mixture was kept in a nitrogen atmosphere inside the flask and agitated for 15 hours. The insoluble matters were removed through suction filtration and then the solvent was removed from the filtrate under vacuum. After purifying the resulting viscous solid substance through reprecipitation it was dried in a vacuum and 3.6 g (76%) of a phosphonic acid ester terminal type-hyperbranched polymer (11), assuming the state of a pale yellow viscous solid substance, was obtained (see reaction formula 5 below). The pale yellow viscous solid substance thus obtained then underwent a process of hydrolysis in methanol and, as a result, 3.3 g of a hyperbranched polymer (12) having a phosphonic group at the terminal of the molecule thereof was obtained.

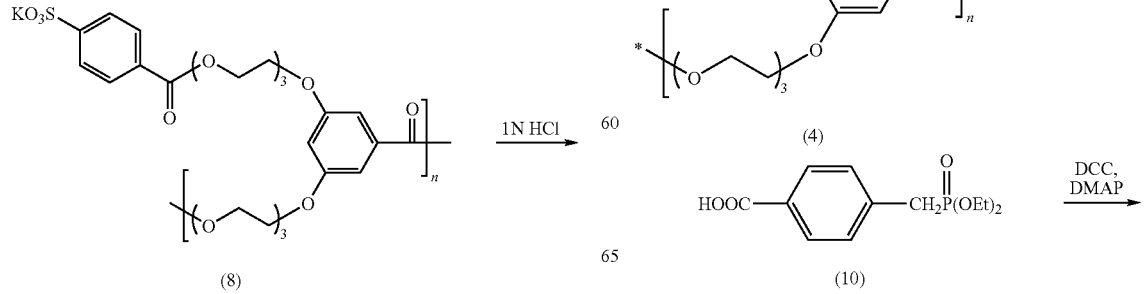

-continued

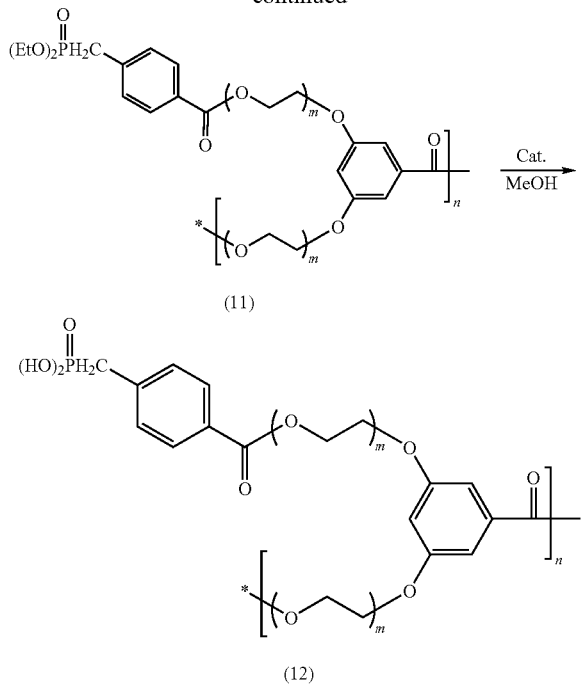

(11)

(12)

Example 3

0.8 g of the sulfonic acid terminal-type hyperbranched polymer (9) obtained in example 1 was measured into a 50 mL eggplant-shaped flask and dissolved in 1.6 g of N-methylpyrolidone added therein. Then, 0.2 g of polyethylene glycol diacrylate (Mw=700) was added into the solution and the solution was agitated for 30 minutes. The solution was then cast onto a glass plate, and after the solvent was removed at 80° C., heat was applied over a period of 12 hours in a vacuum at 120° C. As a result, a solid-state polymer electrolyte membrane constituted with a hyperbranched polymer having an acidic functional group disposed at the terminal thereof and a bridged polymer assuming a network structure was obtained.

Test Examples

Ionic Conductivity Measurement

Since a film of solid-state polymer electrolyte membranes constituted with the hyperbranched polymers obtained in examples 1 and 2 through the methods described above become softened at high temperature and their shapes change as a result, they were each held with a tetrafluoroethylene O-ring (with an inner diameter of 8 mm and a thickness of 100 μm) so as to sustain a specific film thickness. Then, the film attached to the O-ring was held between thin platinum plates (with a diameter of 13 mm and a thickness of 500 μm) and stainless steel electrodes were sandwiched on the outside of the platinum plates so as to hold the assembly together. It was then placed in a measurement cell constituted of tetrafluoroethylene. A preliminary test was conducted to confirm that the film of the solid-state polymer electrolyte membrane achieving proton conductivity, obtained in example 3, did not become softened at high temperature and thus its shape did not change at high temperature, assuring a sufficient level of mechanical strength. Then, a similar measurement cell was prepared with the solid-state high polymer electrolyte membrane obtained in example 3, without using a tetrafluoroethylene O-ring. The samples were left in a 60° C. atmosphere for half a day and the temperature was then raised to 150° C. The samples were left at 150° C. for half a day. Subsequently, a complex AC impedance measurement apparatus was utilized to measure resistance values with blocking electrodes over a 10 mmV amplitude through an AC 2-terminal method (1 MHz to 1 Hz) while the temperature was lowered in 10° C. steps. Based upon the resistance values thus measured, ionic conductivities at various temperatures were determined.

The results of the ionic conductivity measurement described above are presented in FIG. 1. As FIG. 1 indicates, the hyperbranched polymer with the acidic functional group obtained in example 1 demonstrated a high level of conductivity of $10^{-4}$ S/cm at 150° C. with no humidification. A Nafion film available for industrial use constitutes an insulator if it is not humidified. In addition, it was learned that the hyperbranched polymers with acidic functional groups achieved in examples 2 and 3, too, demonstrated desirable ionic conductivity levels.

Figure 2:
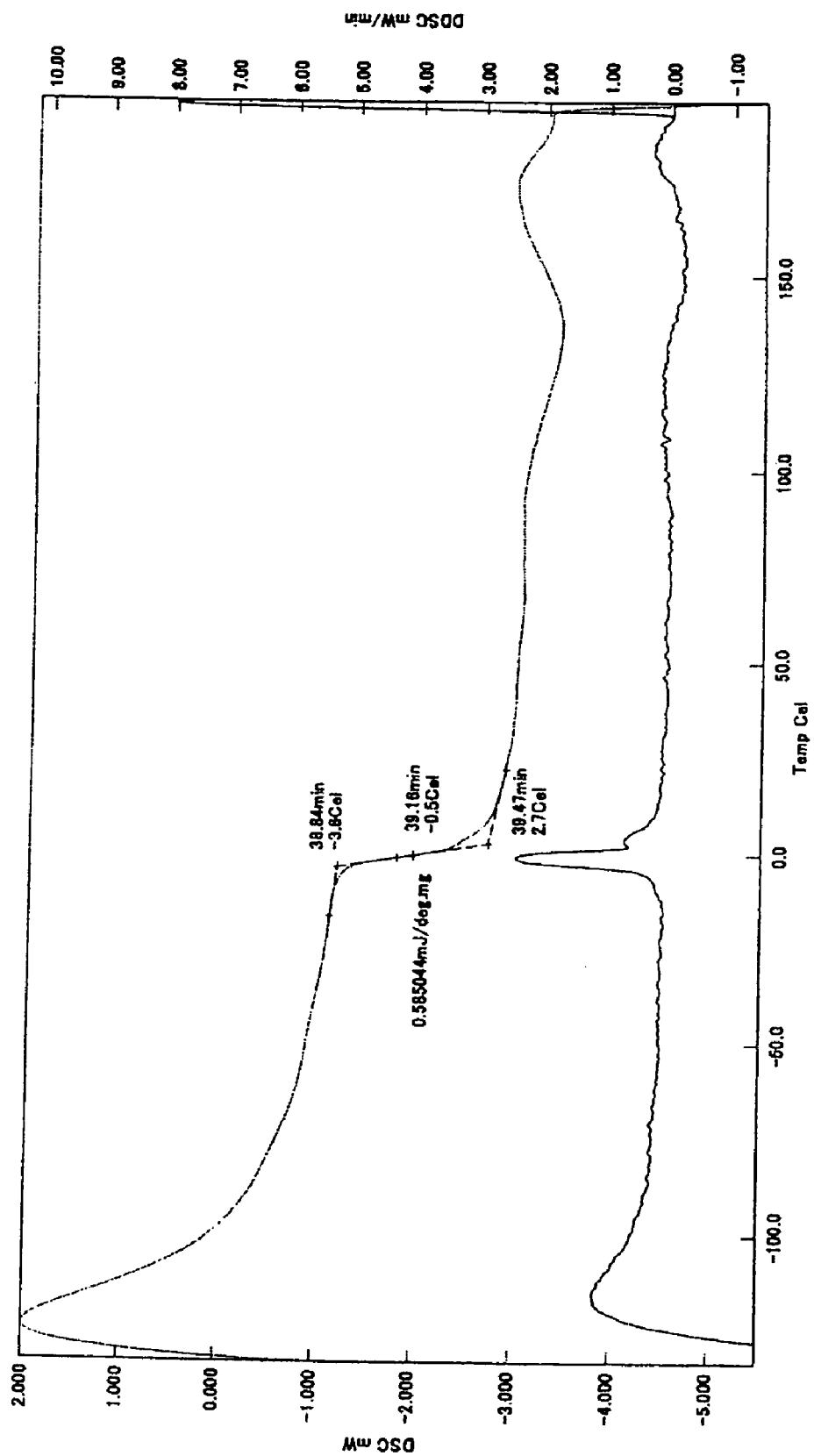
FIG. 2 is a graph of the glass transition point of the hyperbranched polymer having an acidic functional group disposed at the terminal of the side chain thereof, achieved in example 1.
Figure 3:
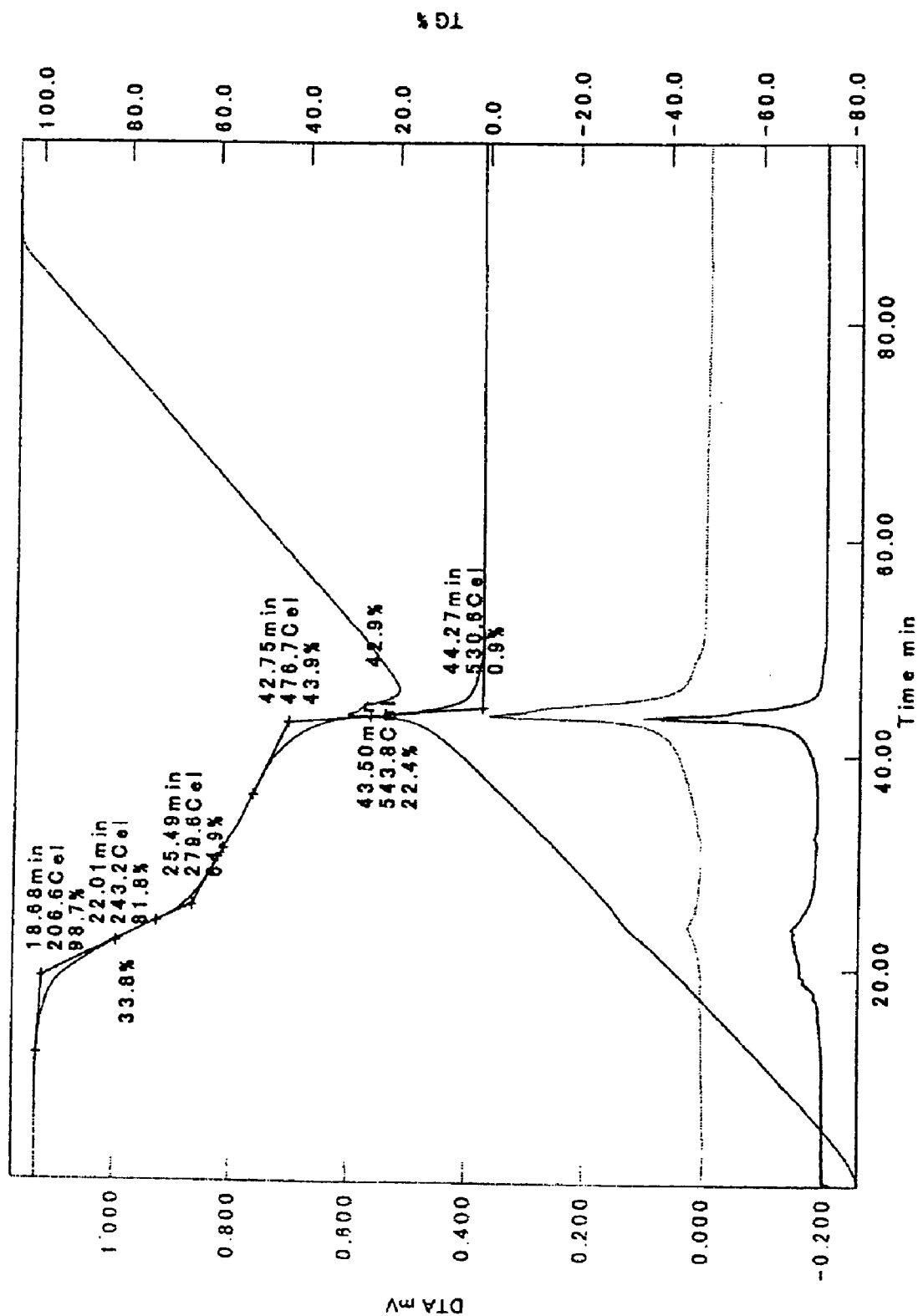
FIG. 3 is a graph of the thermogravimetric change observed in the hyperbranched polymer having an acidic functional group disposed at the terminal of the side chain thereof, achieved in example 1.

FIG. 2 presents the results of glass transition temperature measurement conducted on the hyperbranched polymer (9) with the acidic functional group synthesized as explained in reference to example 1 by using a differential scanning calorimeter (DSC) and FIG. 3 presents the results of thermogravimetric (TG/DTA) measurement conducted on the hyperbranched polymer achieved in example 1. The results indicate that the glass transition temperature was −0.5° C., that the polymer achieved a significant heat resisting property with hardly any weight loss observed at temperatures equal to or lower than 200° C. and a weight loss of 1.3% observed at 206.6° C.

Example 4

Manufacturing and Evaluating Solid-State Polymer Electrolyte Fuel Cell

Figure 4:
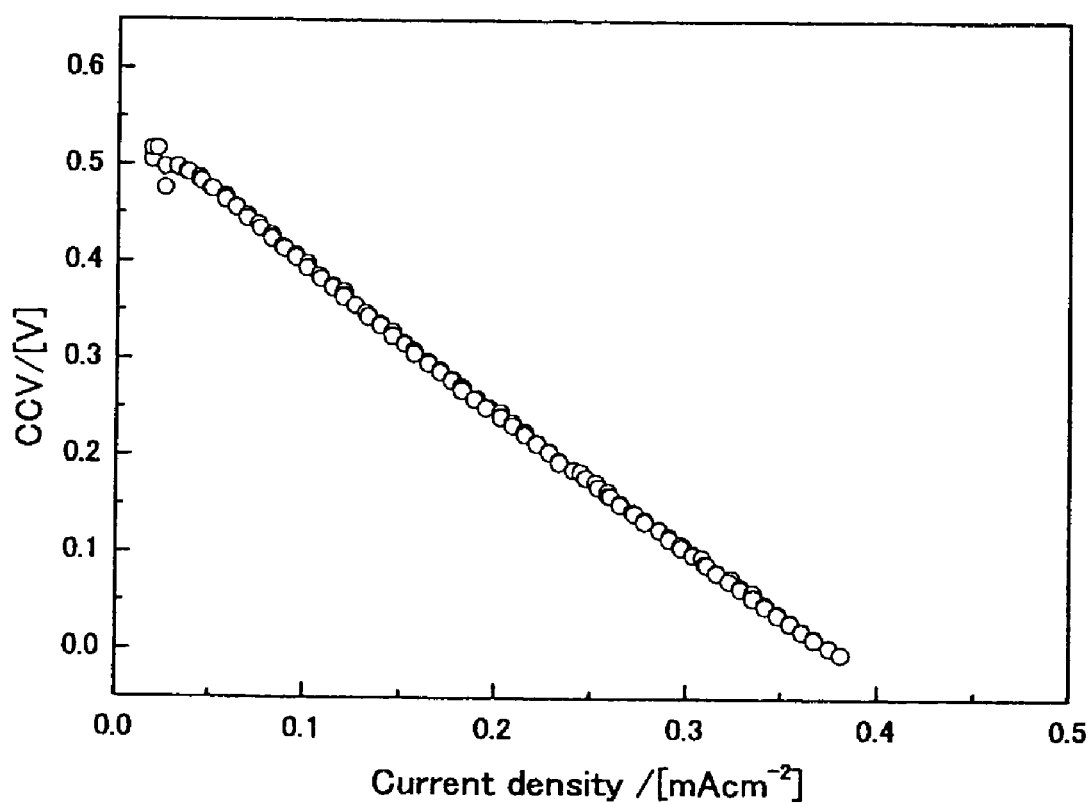
FIG. 4 is a graph of the relationship between the cell voltage and the current density observed in the fuel cell achieved in example 4.

A positive electrode and a negative electrode were formed as described below when manufacturing a solid-state polymer electrolyte fuel cell by using the proton conductive solid-state polymer electrolyte membrane obtained in example 3. First, 1.0 g of carbon supporting 20 mass % of platinum to act as a catalyst was measured and the carbon thus measured was dispersed in 2.5 g of N-methylpyrolidone. Then 0.2 g of the solid-state polymer electrolyte obtained in example 1 was dissolved in the solution and after the solution was agitated for approximately 30 minutes, it was coated onto carbon paper by using a doctor blade. The solid-state polymer electrolyte membrane in example 1 coating on the carbon paper was allowed to dry over a period of one hour at 80° at normal pressure. It then underwent a process of vacuum drying over a period of one hour at 80°. As a result, 1.2 mg/cm² of a catalyst layer was formed. A 3 cm-square positive electrode and a negative electrode obtained by slicing the catalyst layer were set so as to sandwich a 5 cm-square electrolyte membrane constituted with the proton conductive solid-state polymer electrolyte obtained in example 3 at the center of the film, thereby forming a membrane electrode assembly. In addition, in order to prevent a gas leak from occurring at the electrolyte portion of the membrane electrode assembly thus formed, a gasket constituted of a fluoro-rubber was disposed, the membrane electrode assembly was held between two carbon separators having formed therein grooves to function as gas passages, and end plates were set on the carbon separators. Then, the assembly was tightened at 5 kgf/cm with a torque wrench and thus, a solid-state polymer electrolyte fuel cell was manufactured. A power generation test was then conducted on the solid-state polymer electrolyte fuel cell by using hydrogen as the anode gas and air as the cathode gas. The cell temperature was set at 130° C., hydrogen and oxygen were supplied respectively at 100 mL/min and 300 mL/min without humidifying either gas. The performance of the solid-state polymer electrolyte fuel cell was evaluated by measuring the change in the voltage through current scanning executed with the electrochemical interface 1255 manufactured by Solartron. FIG. 4 shows the relationship between the voltage (CCV) and the current density observed in the fuel cell manufactured in the example.

As FIG. 4 indicates, it was possible to generate power with the fuel cell in example 4 until the current density reached approximately 0.4 mA/cm². It was possible to generate power with the fuel cell in example 4 at the high temperature of 130° C. without humidifying the gases. This indicates that while it is normally necessary to use a humidifier when operating a fuel cell at high temperature, the present invention provides a fuel cell that can be engaged in operation at high temperature without requiring the use of a humidifier.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

The invention claimed is:
1. A solid-state polymer electrolyte membrane comprising:
primary constituent of a poly(bis(oligo-ethylene glycol) benzoate) hyperbranched polymer expressed by general formula 1 below,

(general formula 1)

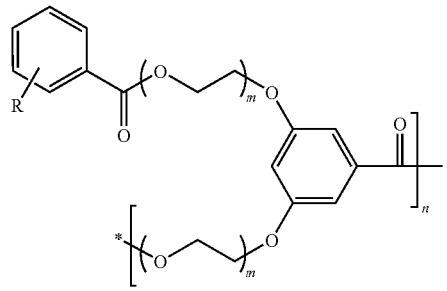

wherein R is a terminal acidic functional group, m is a number from 1 to 6, and * is a connection point of a subsequent bis(oligo-ethylene glycol) benzoate primary constituent.

2. A solid-state polymer electrolyte membrane according to claim 1, wherein:
the poly(bis(oligo-ethylene glycol) benzoate) is a polymer having a dendritic structure obtained by polymerizing an $A_2B$-type monomer synthesized from an oligo-ethylene oxide chain expressed by $(CH_2CH_2O)_m$ (m=1 to 6) and dioxybenzoate.

3. A solid-state polymer electrolyte fuel cell, comprising a solid-state polymer electrolyte membrane according to any of claims 1 or 2.

* * * * *

UNITED STATES PATENT AND TRADEMARK OFFICE
CERTIFICATE OF CORRECTION

| | | |
|---|---|---|
| PATENT NO. | : 7,993,767 B2 | Page 1 of 1 |
| APPLICATION NO. | : 10/594997 | |
| DATED | : August 9, 2011 | |
| INVENTOR(S) | : Takahito Itoh et al. | |

It is certified that error appears in the above-identified patent and that said Letters Patent is hereby corrected as shown below:

In the Claims

Column 12, Claim 1, line 3     Before "primary"
                               Insert -- a --

Signed and Sealed this
Twenty-sixth Day of November, 2013

Margaret A. Focarino
*Commissioner for Patents of the United States Patent and Trademark Office*